(12) United States Patent
Soggio

(10) Patent No.: US 8,336,899 B2
(45) Date of Patent: Dec. 25, 2012

(54) FORK, PARTICULARLY FOR SPORT MOTORCYCLES

(75) Inventor: Gianni Dal Soggio, Zane (IT)

(73) Assignee: Dal Soggio S.r.l., Zané (IT)

( * ) Notice: Subject to any disclaimer, the term of this patent is extended or adjusted under 35 U.S.C. 154(b) by 437 days.

(21) Appl. No.: 12/590,716

(22) Filed: Nov. 12, 2009

(65) Prior Publication Data

US 2010/0123297 A1    May 20, 2010

(51) Int. Cl.
 *B62K 25/08*    (2006.01)
(52) U.S. Cl. .......................................... 280/276; 280/283
(58) Field of Classification Search .................. 280/276, 280/277, 279, 275, 283, 284
See application file for complete search history.

(56) References Cited

U.S. PATENT DOCUMENTS

| 3,989,263 | A * | 11/1976 | Stuck et al. | 280/283 |
| 4,705,491 | A * | 11/1987 | Andersson | 464/167 |
| 5,380,026 | A * | 1/1995 | Robinson | 280/276 |
| 6,186,487 | B1 * | 2/2001 | Kesinger | 267/249 |
| 7,607,676 | B1 * | 10/2009 | Chu | 280/276 |
| 2002/0149169 | A1 * | 10/2002 | Oteri | 280/276 |
| 2002/0195755 | A1 * | 12/2002 | Hoose | 267/64.26 |

* cited by examiner

*Primary Examiner* — Anne Marie M Boehler
(74) *Attorney, Agent, or Firm* — Hedman & Costigan, P.C.; James V. Costigan

(57) ABSTRACT

An improved fork (1) for sport motorcycles, comprising a support group (2) suitable to be connected with the frame of the motorcycle, a pair of shock absorber arms (3, 4), which vary the position of the frame of the motorcycle in respect of the front wheel of the motorcycle itself as a result of the application of a load, each of which connected with the support group (2) and including an outer sheath (5) and a stem of force (6) slidingly and telescopically coupled one with each other, guide and support means (7), interposed between the outer sheath (5) and the stem of force (6) of the shock absorber arms (3, 4), which minimize friction between the stem of force (6) and the outer sheath (5).

16 Claims, 5 Drawing Sheets

FORK, PARTICULARLY FOR SPORT MOTORCYCLES

The present invention relates to an improved fork, particularly but not exclusively for sport motorcycles such as for example those produced as prototypes by the most famous manufacturer firms.

As known, the fork of a motorcycle is placed at the front portion of the motorcycle itself and connects the front tire with the frame, allowing the rider to steer. The fork controls the movement of the frame with respect to the tire, acting as a suspension, and damps and slows the oscillation, acting as a shock absorber. The technical characteristic of a fork are usually a compromise between the needs of road-holding of the motorcycle and those of comfort for the pilot and any passengers.

There are currently on the market forks of various manufacturing types ranging from the most dated girder, springer and swinging arm forks to the most recent and widespread telescopic or oil-pressure forks, upturned or "up-side-down, Saxon-Motodd or telelever and Hossack/Fior or duolever.

In particular, the present invention relates to telescopic forks and upturned forks.

The telescopic forks are the front suspensions more utilized for their simplicity of construction and assembly, besides for the lightness.

They consist of two pairs of cylindrical tubular bodies reciprocally coaxial, one of which sliding inside the other: the tubular body with smaller diameter is called stem, while the tubular body with larger diameter is called sheath.

The pairs of tubular bodies are reciprocally separated and parallel and each of them is connected with the frame of the motorcycle through two trapezoids or steering plates.

A spring and a damping support, usually of the hydraulic type containing synthetic oil of determined density are housed in the inner chamber defined between the stem and sheath.

Moreover, the telescopic or oil-pressure forks include guide and support means, such as a bush or a guide brass made for example of brass, bronze, Teflon or other materials at low coefficient of friction, interposed between the stem and the sheath in order to minimize friction between the bodies in mutual sliding. The guide and support means have a key role for the useful lifetime and for a better functioning of forks and, consequently, for the efficiency of braking, especially at bends, and the traction of tire to the road or track, as will be better analysed thoroughly shortly.

Even the upturned forks, otherwise called "upturned stems forks", are nowadays widely adopted mostly because they allow to carry out hydraulic adjustments with greater comfort.

The upturned forks are actually a derivation of the telescopic forks properly said from which they differ precisely for being mounted upturned, namely with the stem coupled with a pin fixed to the tire and the sheath connected with the frame of the motorcycle through the already mentioned steering plates.

As said, therefore, both the telescopic forks and the upturned forks the guide and support means mounted between the stem and the sheath are vital for a correct and effective functioning and for a high life of the forks.

The guide and support means include at least one brass or bush made of a material with reduced coefficient of friction, whose lateral face faces and cooperates by contact on one hand with the inner surface of the sheath and on the other hand with the outer surface of the stem.

The guide and support means used in the forks of the known art are, therefore, sliding rings provided with sliding surfaces which cooperate by slithering with the surfaces of the stem and the sheath one mobile with respect to one other.

The coupling of the guide and support means with the sheath and stem necessarily occurs with a predefined clearance to offset the inevitable deformations of trim of the aforesaid mechanical members (bushes) of the forks.

In order to limit the friction between the surfaces in mutual movement, the known forks preferably comprise a film of lubricating oil, playing also as a shock absorber of end of stroke, which flows in the clearance defined between the sheath and the guide and support means and between the latter and the stem.

Nevertheless, the known forks just described in their essential traits have some recognized drawbacks.

The main drawback comes from the fact that the guide and support means are over time subject to seizure in consequence of radial or lateral thrusts which the continuous braking by the driver of the motorcycle inevitably generate on them.

Considering the motorcycle races, during which the pilot primarily if not exclusively pinches the brakes of the front wheel, thus transferring to this the load of his own body and of the motorcycle, multiplied by the speed of the latter, the drawback seems to be obvious.

Such a problem depends on the side surface of the guide and support means which, as mentioned, determines a sliding friction with the moving surfaces with which it comes into contact.

The seizure of the guide and support means reflects in another drawback, namely in a loss of traction of the wheel to the road or, better, to the track.

As a consequence, this means that pilot must inevitably reduce the force with which he operates the brakes of the motorcycle and, thus, the speed of arrival or entry to the slowing down point, for example on a bend, otherwise he falls or goes off the road or track.

In motorcycle racing, what just said raises the chronometric time for the completion of the track lap, influencing in a negative way on a fundamental issue for the authorized staff.

A last but not least drawback is constituted by the fact that the clearance, even if limited, left between the sheath and the guide and support means and between these and the stem causes vibrations to the frame of the motorcycle which are rather maddening when driving, contributing to the loss of traction mentioned above, with the consequent risks for the physical safety of the pilot.

The present invention intends to remedy the drawbacks of the prior art described above.

In detail, primary aim of the invention is to implement an improved fork, particularly for sport motorcycles, in which the guide and support means maintain their own functional capacity unchanged, at the best state, longer than the equivalent forks of the known type.

It a second aim of the invention to make available an improved fork which, compared to the known art, eliminates or significantly reduces the vibrations, produced by its part members and transmitted to the frame of the motorcycle, which, especially at entry of a bend, disturb not little the guide of the motorcyclist.

As part of these aims, task of the invention is to provide an improved fork which does not affect at all, or affects at an extent somewhat lesser than the forks of the known type on the loss of traction to the road by the front wheel of the motorcycle.

Another task of the invention is to develop an improved fork which allows the pilot, especially during races, to drive the motorcycle to the limit, at the best possible performances, and, at the same time, in maximum security conditions.

A last but not least aim of the present invention is to plan an improved fork more reliable to manufacture than the forks of the known technique.

The aforesaid aims are achieved by an improved fork, particularly for sport motorcycles, according to the attached claim 1, to which they refer for the sake of brevity.

Further features of detail of the improved fork of the invention are described in the relative dependent claims.

Advantageously, the improved fork according to the invention keeps optimum running and operation conditions under the continuous stresses made by the pilot and for a time much longer than the forks of the known type.

Such an advantage derives from the fact that in the fork of the invention guide and support means include rolling means has been adopted, cooperating and interfering with the surfaces in mutual movement of stem and sheath of each shock absorber arm.

Still advantageously, the improved fork of the invention is of simple construction, and compared to the current forks, operates for a long time at the optimum conditions without the need to put lubrication oil between the sheath and the guide and support means and between the latter and the stem.

Equally advantageously, the improved fork of the invention assures to the front wheel of the motorcycle, during braking, stability and traction to the road or track greater than the forks of the known technique.

On the one hand, this depends on the predisposition of the guide and support means of the spheres rolling type which determines a rolling friction with the surfaces of the stem of force and the outer sheath with which cooperate, on the hand on the lack of clearance in the coupling between stem, guide and support means and sheath.

In an advantageous way, finally, the fork range of the present invention allows the motorcyclist, especially during competitions on track, to drive the motorcycle at the maximum of its potential and in conditions of absolute safety, at least as far as those directly related to the functional and constructive integrity of the fork are concerned.

According to a preferred embodiment of the invention, the stem of force of each shock absorber arm is made of metallic material with high hardness, not less than 58 HRC (Rockwell's hardness), for example tempered and grinded with high precision steel.

Such a constructive measure increases the ultimate tensile stress of the stem of force and keeps unchanged or however high the sensitivity of the improved fork of the invention while increasing load.

The aforesaid aims and advantages, as well as others emerging below, will appear to a greater extent by the description that follows related to a preferred embodiment of the invention given by way of illustrative, but not limiting, with the aid of drawings where:

Figure 1:
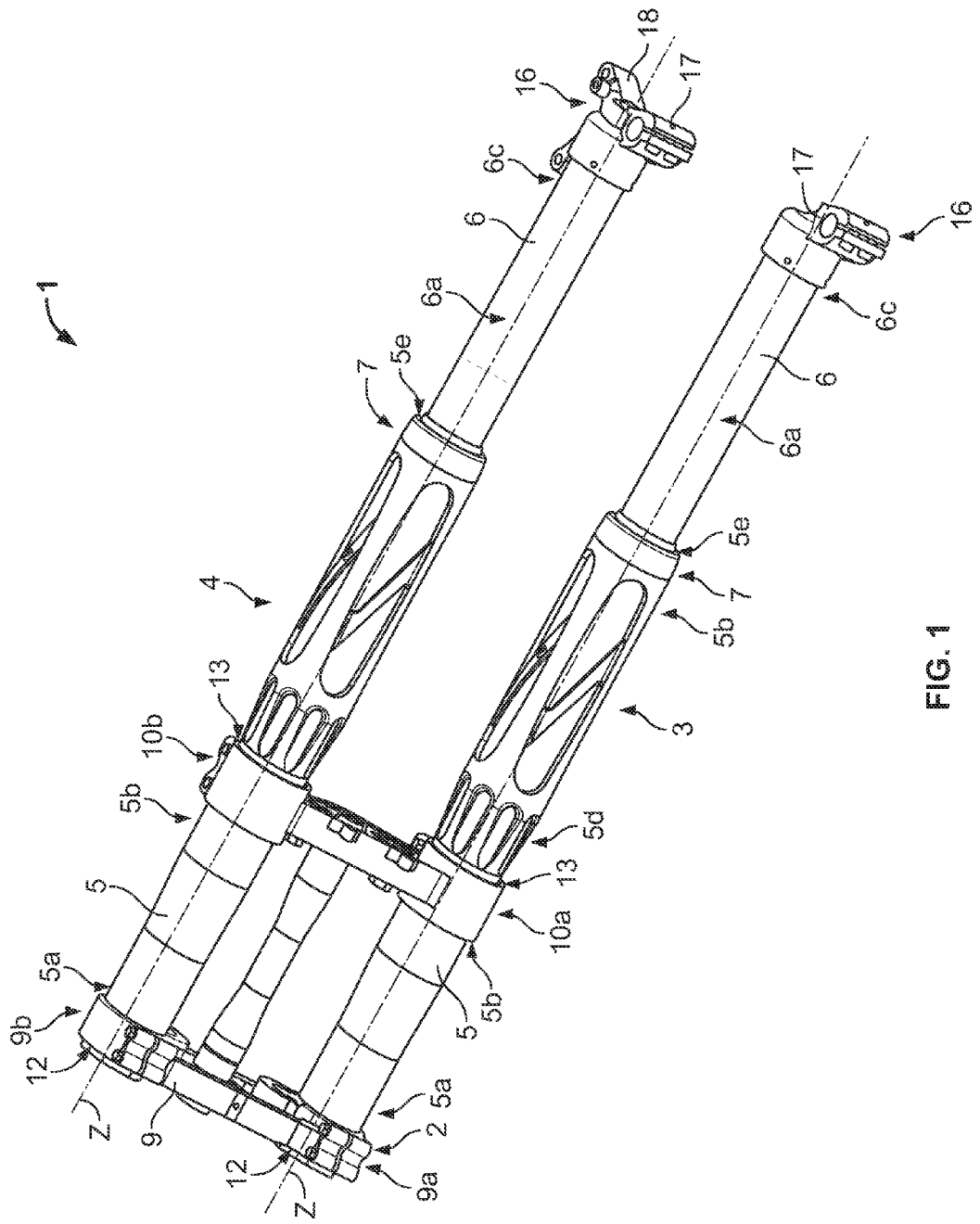
FIG. 1 is a perspective view of the improved fork of the invention.

The improved fork of the invention, preferably installed in sport motorcycles such as competition prototypes with which pilots run races on track, is illustrated in FIG. 1, where it is globally numbered with 1.

For the sake of explanatory simplicity, the motorcycle as a whole is not shown in the attached figures.

Figure 2:
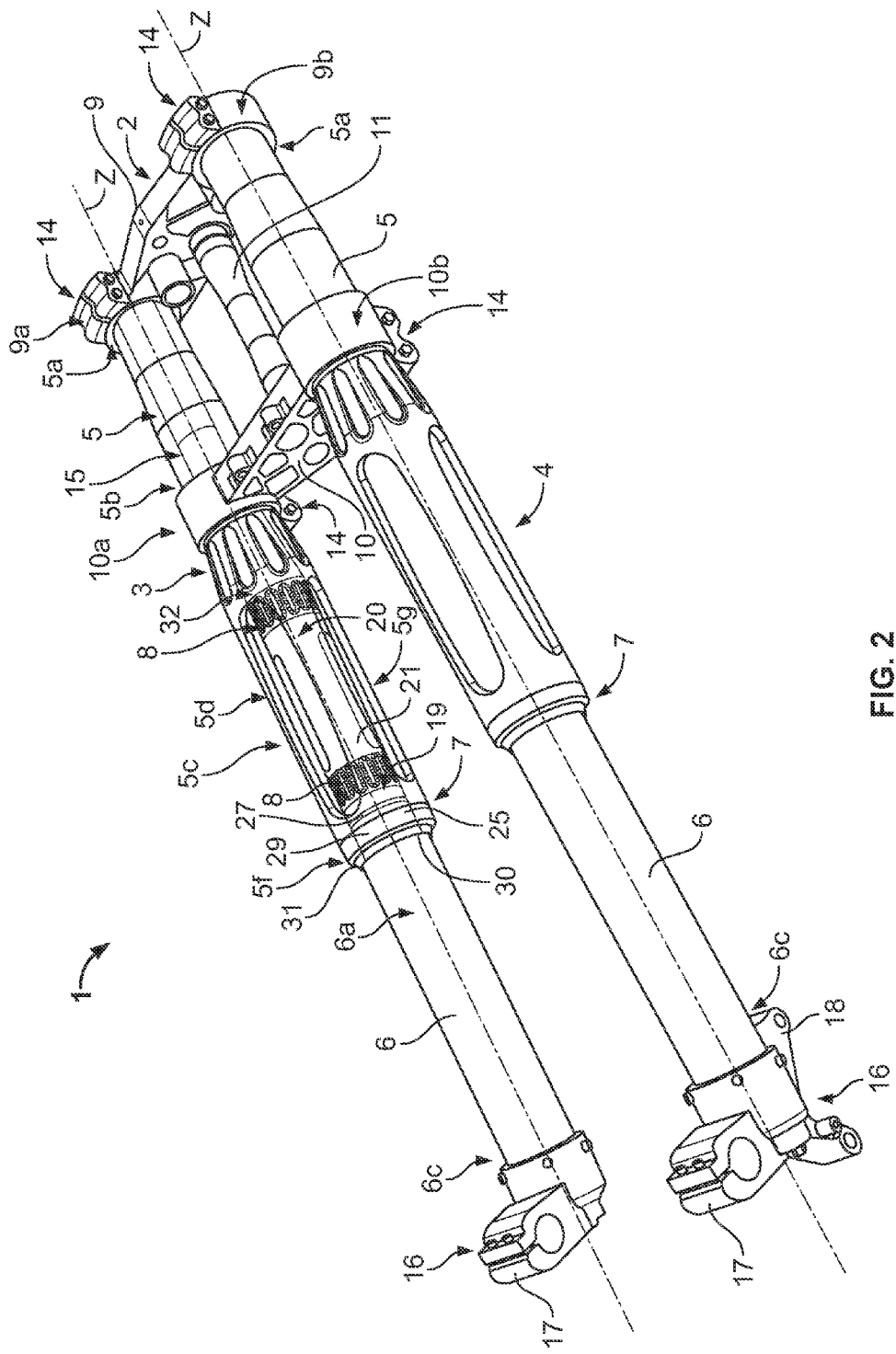
FIG. 2 is a simplified and partially sectioned view of FIG. 1.

As it is observed, the improved fork 1 includes:
a support group, overall indicated with 2, suitable to be connected with the frame of the motorcycle, more precisely to steering;
a pair of shock absorber arms 3, 4, suitable to vary the position of the frame of the motorcycle in respect to the front wheel of the same as a result of the application of a load, each of which connected with the support group 2 and including an outer sheath 5 and a stem of force 6 slidingly and telescopically coupled one with each other;
guide and support means, as a whole marked with 7 and better visible in FIG. 2, interposed between the outer sheath 5 and the stem of force 6 of both the shock absorber arms 3, 4, suitable to minimize friction between the stem of force 6 and the outer sheath 5.

According to the invention, the guide and support means 7 include rolling means, as a whole numbered with 8, which cooperate by contact with the outer surface 6a of the stem of force 6 creating a rolling friction between the stem of force 6 and the guide and support means 7.

The support group 2 is of the type in itself known to the person skilled in the art, including an upper plate 9, suitable to be connected with the frame of the motorcycle, a bottom plate 10 spaced apart from the upper plate 9 with which is made integral by means of the steering shaft 11 and by means of the outer sheath 5 of each of the shock absorber arms 3, 4.

FIGS. 1 and 2 show that the outer sheath 5 of each of the shock absorber arms 3, 4 is connected with both the plates 9, 10 just introduced.

Figure 3:
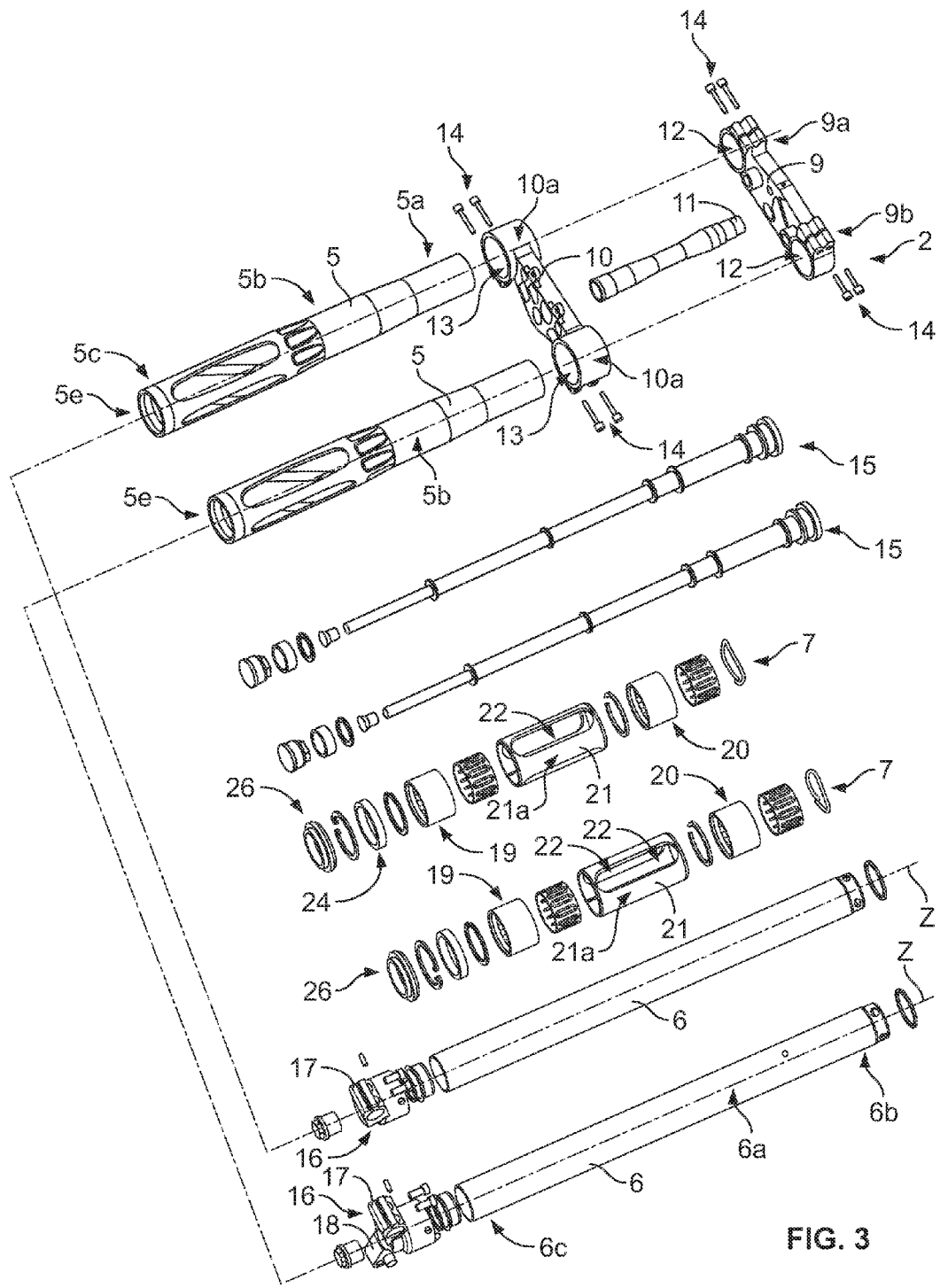
FIG. 3 is the exploded view of FIG. 1.

Specifically, the outer sheath 5 has a first end 5a inserted into a first through hole 12 made in each terminal part 9a, 9b of the upper plate 9, and an inner portion 5b conjugated with a second through hole 13 made in each end 10a, 10b of the second plate 10, as better illustrated in FIG. 3.

Once inserted into the through holes 12, 13 of the plates 9, 10 respectively, the outer sheath 5 is permanently coupled with them through fastening means, altogether marked with 14 and of type in itself known.

Advantageously, the stem of force 6 is made of metallic material with high hardness, not less than 58 HRC (Rockwell's hardness), for example tempered and grinded with high precision steel.

This allows the rolling means 8, belonging to the guide and support means 7 and described much more in details later on, to effectively perform their own function when the outer sheath 5 and stem the of force 6 slide one into another due to the application of a load deriving from braking of the front wheel made by the driver and/or from the absorption of the roughnesses of the ground.

FIG. 3 also shows further mechanical members of the improved fork 1, what's more typical of motorcycles forks and already available on the market, such as for example the inner telescopic cartridge 15 of the hydraulic type, containing oil.

In rest conditions of the shock absorber arms 3, 4, the inner cartridge 15 is partially inserted into the stem of force 6, while in work conditions of such arms 3, 4, it is fully inserted into the stem of force 6.

The inner cartridge 15 plays a damping function together with a spring, for the sake of simplicity not represented, interposed between the inner cartridge 15 and the stem of force 6.

The outer sheath 5 and the stem of force 6 are coaxial one with each other along a longitudinal axis of symmetry Z and present each a tubular structure.

The stem of force 6, for example having a length of 600 mm, slides inside the outer sheath 5 and, in rest conditions of the shock absorber arms 3, 4, is inserted into the outer sheath 5 for at least a first end 6b.

In a preferred manner, the improved fork 1 of the invention includes attach means, overall indicated with 16, coupled with a second end 6c of the stem of force 6, used to connect the same stem 6 with the front wheel of the motorcycle.

It is not excessively dwelled here upon the attach means 16 which, according to a construction in itself known in the field under consideration, include a feed 17, one for each shock absorber arms 3, 4: one of the feet 17 is also equipped with a shaped projection 18 which receives the braking pliers, not shown.

Going into detail of the constructive members that more concern the present invention, it is pointed out that the description will continue, for the sake of explanatory convenience, with reference to the outer sheath 5 and the stem of force 6 only of the shock absorber arm 3, meaning what said for this valid also for the other shock absorber arm 4.

The guide and support means 7 in this case comprise two composite sliding rings 19, 20 between them equal, internally coaxial to the outer sheath 5, having each the outer wall facing the inner surface of the outer sheath 5, and externally coaxial to the stem of force 6 having each the inner wall facing the outer surface 6a of the stem of force 6.

In other embodiments, not shown, of the improved fork of the invention, the guide and support means may include a number of composite sliding rings different than that just indicated, for example a single ring interposed between stem and sheath.

The first composite sliding ring 19 is arranged at the second free end 5c of the outer sheath 5, while the second composite sliding ring 20, coaxial to the first ring 19, is placed at the substantially intermediate portion 5d of the outer sheath 5.

More specifically, the sliding rings 19, 20 are contained in the outer sheath 5, to which are coupled by mechanical interference, and are separated one from each other by a tubular connection spacer 21 coaxial and side-by-side to the sliding rings 19, 20 against which it is arranged close to.

Figure 4:
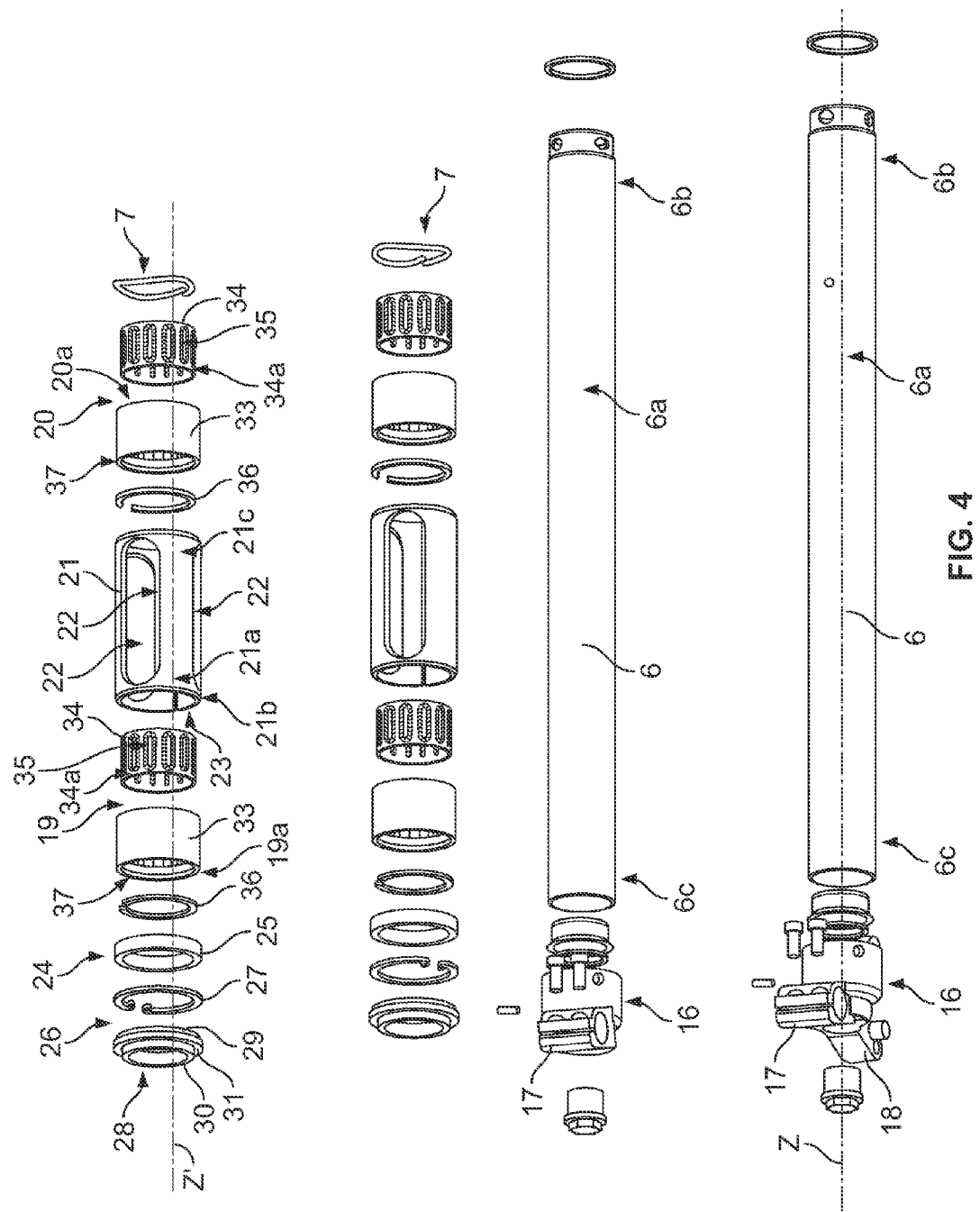
FIG. 4 is an enlargement of some particulars of FIG. 3.

The tubular spacer 21 is made of aluminium and, as better visible in FIG. 4, presents the on the lateral surface 21a a plurality of uniformly distributed through openings 22: the choice of these constructive arrangements is dictated by the need to lighten the various part members of the improved fork 1.

In addition, the tubular spacer 21 presents a linear cut 23, made with the aim of making it elastically yielding and flexible, which affects the lateral surface 21a of the tubular spacer 21 from a side edge 21b to another edge 21c according to a direction Z' parallel to the longitudinal axis Z.

The improved fork 1 also includes seal means, as a whole indicate with 24, coupled laterally and coaxially with the first ring 19 and turned towards the inlet 5a of the outer sheath 5, suitable to prevent the leakage of oil from the outer sheath 5.

Preferably but not exclusively, the seal means 24 comprise an oil seal ring 25 pressure fitted inside the inlet 5a of the outer sheath 5 and positioned close to the lateral edge 19a of the first ring 19.

In an advantageous way, the improved fork 1 includes insulating means, overall numbered with 26, coaxially arranged close to the seal means 24 and facing outside the inlet 5a of the outer sheath 5 in order to interfere with the outer surface 6a of the stem of force 6.

The insulating means 26 have the function of preventing the entry of impurities of various kinds, such as for example dust, inside the outer sheath 5 and, therefore, their contact with the sliding rings 19, 20, thereby assuring them maximum operative sensitivity, synonymous of optimal functional conditions.

At preferential but not binding title, the insulating means 26 comprise:
  an intermediate circular clip placed externally coaxial and close to the oil seal disc 25;
  a dust cover ring 28 pressure fitted in the inlet 5a of the outer sheath 5 and placed externally coaxial and close to the intermediate clip 27, provided with a first portion 29 contained in the outer sheath 5 and with a second portion 30 protruding from the outer sheath 5 and interfering with the outer surface 6a of the stem of force 6, the portions 29, 30 being separated one from each other by an annular projection 31 arranged close to the lower edge 5f surrounding the inlet 5a of the outer sheath 5.

As it is observed in FIG. 2, the outer sheath 5 is provided on the inner surface 5g, at the intermediate portion 5d, with an annular shoulder 32 against which the lateral edge 20a of the second ring 20 contrasts. In this way, when the stem of force 6, under the load applied by the pilot or the hollows of the ground on the improved fork 1, enters by sliding inside the outer sheath 5, the guide and support means 7, and in particular the sliding rings 19, 20 and the tubular spacer 21 which connects them, remain substantially fixed in position, playing their own role which is to minimize friction at maximum extent.

Figure 5:
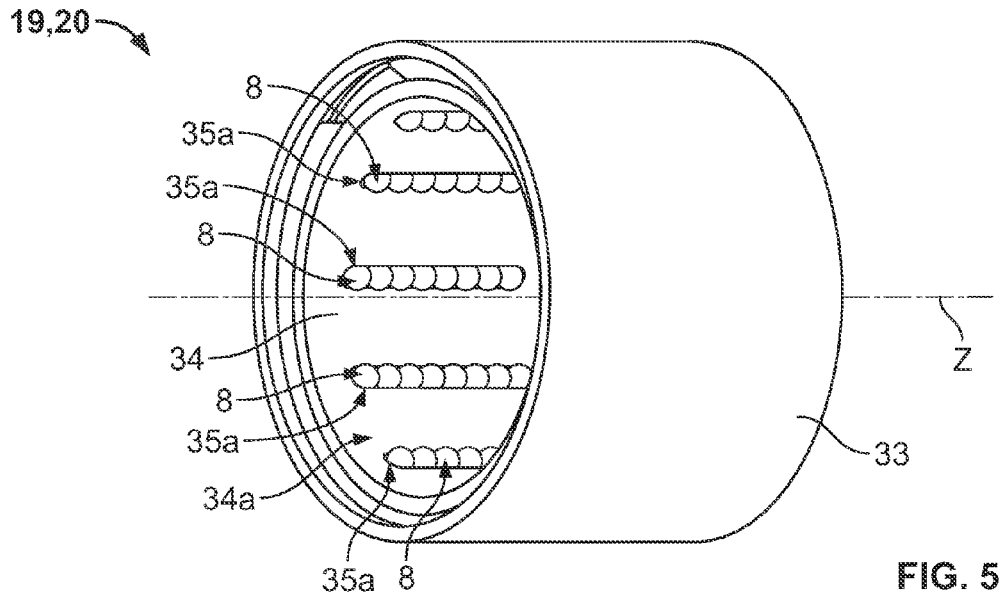
FIG. 5 is the perspective view of an enlarged particular of FIG. 4.
Figure 6:
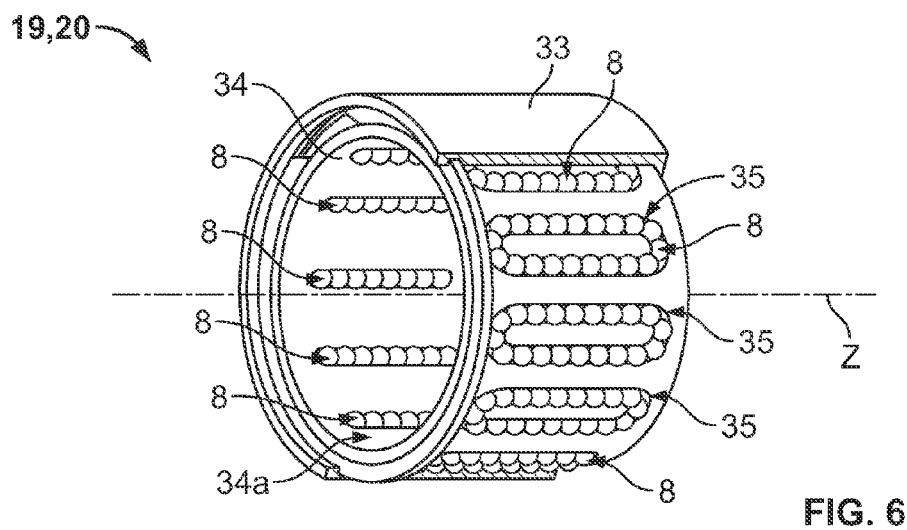
FIG. 6 is a cut off view of FIG. 5.
Figure 7:
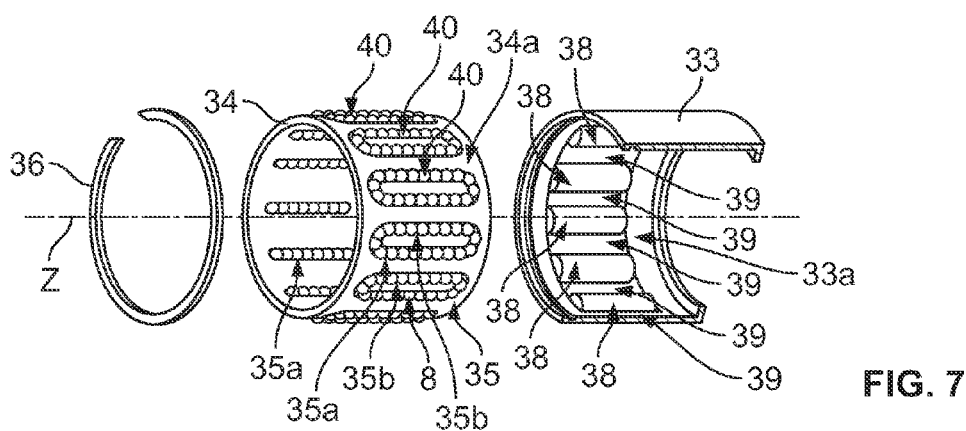
FIG. 7 is the exploded view of FIG. 5.

According to the preferred embodiment of the invention here described, each of the sliding rings 19, 20 includes, as FIG. 4 shows:
  a circular bush 33 coupled by mechanical interference inside the outer sheath 5;
  a tubular cage 34, coupled by means of a bayonet coupling inside the circular bush 33 and having on the side wall 34a a plurality of annular tracks 35 flanked and separated one each other, better shown in the subsequent FIGS. 5-7, within which the rolling means 8 are forced e firmly contained remaining however free to move along a closed path.

Preferably, each of the sliding rings 19, 20 comprises a Seeger ring 36 housed in an annular recess 37 made inside the rings 19, 20: such a Seeger ring serves to make firmer the coupling of the tubular cage 34 with the circular bush 33.

As shown in particular in FIG. 5, a straight stretch 35a of each of the annular tracks 35 is through in the side wall 34a of the tubular cage 34.

At such a straight stretch 35a, the rolling means 8 partially protrude from the side wall 34a towards the inside of the tubular cage 34 in order to cooperate by contact with the outer surface 6a of the stem of force 6.

FIG. 7 shows that the circular bush 33 is provided on the inner wall 33a with a plurality of longitudinal protuberances 38 which are directly front and opposed to the through straight stretch 35a present in each of the annular tracks 35.

The longitudinal protuberances 38 are interspaced one from each other by a plurality of longitudinal grooves 39 directly facing and opposed to a blind straight stretch 35b, opposite to the through straight stretch 35a, of the annular tracks 35.

At the blind straight stretch 35b, the rolling means 8 partially protrude from the side wall 34a towards the outside of the tubular cage 34 in such a way as to cooperate by contact with the inner wall 33a of the circular bush 33.

It is stated precisely that the circular bush 33 is made preferably of the same material with high hardness and working precision with which the stem of force 6 is made of, while the tubular cage 34 is made for example in light alloy, for example brass.

FIGS. 5-7 show, finally, that the rolling means 8 comprise a plurality of spheres 40 associated with each of the sliding rings 19, 20 and cooperating by contact with the outer surface 6a of the stem of force 6.

Under operative conditions, the improved fork 1 of the invention generally acts as the traditional telescopic or upturned forks, from which, however, differs mainly for the type of the guide and support means 7 interposed between the outer sheath 5 and the stem of force 6.

The rolling means 8, of the spheres 40 circulation type, allows a greater sensitivity under the load applied, consisting of the weight of the motorcycle and the body of the motorcyclist, during braking of the front wheel.

The improved fork 1 supports and mitigates more than the forks of the known type the negative effects resulting from radial or lateral thrusts which the violent and sudden braking, especially at a bend during motorcycle races on track, generates on the part members of the fork 1 itself, in particular the guide and support means 7.

Based on the newly exposed, we understand, therefore, that the band improved object of this invention achieves the objectives and realizes the benefits mentioned above.

In execution, changes can be made to the improved fork of the invention consisting, for example, in shock absorber arms of constructive concept different from that one previously described with reference to the drawings.

In particular, in other embodiments the improved fork of the invention can be of the classic telescopic or oil-pressure type rather than upturned as the one on which the description has been here based.

In further embodiments of the invention, the rolling means will be coupled with the guide and support means of only one of the shock absorber arms of the improved fork.

Furthermore, other embodiments of the improved fork here claimed could provide a support group different than that identified in the course of the present description, which does not affect the advantage provided by the current invention.

It is clear that many other variations can be made to improved fork under consideration, without for this reason going out of the novelty principles inherent in the inventive idea here expressed, as it is clear that in the practical implementation of the invention, materials, shapes and sizes of the illustrated details could be any, as needed, and replaced with others technically equivalent.

The invention claimed is:

1. Improved fork (1) for sport motorcycles, including:
a support group (2) capable of being connected to the frame of said motorcycle;
a pair of shock absorber arms (3, 4), suitable to vary the position of said frame of said motorcycle with respect to the front wheel of said motorcycle as a result of the application of a load, each of which connected with said support group (2) and comprising an outer sheath (5) having an inlet (5a) and a second end (5 (c)) and a stem of force (6) slidingly and telescopically coupled one with each other;
guide and support means (7), interposed between said outer sheath (5) and said stem of force (6) of at least one of said shock absorber arms (3, 4), suitable to minimize friction between said stem of force (6) and said outer sheath (5), characterized in that said guide and support means (7) include rolling means (8) which cooperate by contact with outer surface (6a) of said stem of force (6) producing a rolling contact between said stem of force (6) and said guide and support means (7) said guide and support means (7) comprise one or more composite sliding rings (19, 20) internally coaxial to said outer sheath (5), said composite sliding rings (19, 20) having an outer wall facing the inner surface of said outer sheath (5) and externally coaxial to said stem of force (6), said one or more composite sliding rings having an inner wall facing said outer surface (6a) of said stem of force (6).

2. Fork (1) as defined in claim 1 characterized in that said outer sheath (5) and said stem of force (6) are coaxial one to each other along a longitudinal axis of symmetry (Z) and have a tubular structure, with said stem of force (6) sliding inside said outer sheath (5) and, in rest conditions of said shock absorber arms (3, 4), said stem of force (6) is inserted into at least a first end (6b) of said outer sheath (5).

3. Fork (1) as defined in claim 1 characterized in that it includes attach means (16), coupled with a second end (6c) of said stem of force (6), suitable to connect said stem of force (6) with said wheel of said motorcycle.

4. Fork (1) as defined in claim 1 characterized in that it comprises a first composite sliding ring (19), placed at the second end (5c) of said outer sheath (5), and a second composite sliding ring (20), coaxial to said first ring (19) and placed at the substantially intermediate portion (5d) of said outer sheath.

5. Fork (1) as defined in claim 4 characterized in that said sliding rings (19, 20) are contained in said outer sheath (5), said sliding rings (19, 20) and said outer sheath being coupled to each other by mechanical interference, and being separated from each other by a tubular connection spacer (21) that is coaxial and side-by-side to said sliding rings (19, 20).

6. Fork (1) as defined in claim 5 characterized in that said tubular connection spacer (21) has a lateral surface (21a) having a plurality of uniformly distributed through openings (22), suitable to lighten said tubular connection spacer (21), said tubular connection spacer having a linear cut (23), suitable to make said tubular connection spacer (21) elastically yielding in order to allow said lateral surface (21a) of said tubular spacer (21) to move from a side edge (21b) to another edge (21c) along a direction (Z') that is parallel to said longitudinal axis of symmetry (Z).

7. Fork (1) as defined in claim 4 characterized in that it includes seal means (24) positioned laterally and coaxially with a lateral edge (19a) of said first ring (19), said seal means (24) being suitable to prevent the leakage of oil from said outer sheath (5).

8. Fork (1) as defined in claim 7 characterized in that said seal means (24) comprise an oil seal ring (25), pressure fitted inside said inlet (5e) of said outer sheath (5) and positioned close to the lateral edge (19a) of said first ring (19).

9. Fork (1) as defined in claim 8 characterized in that it include insulating means (26) coaxially arranged close to said seal means (24) and facing outside said inlet (5a) of said outer sheath (5) in order to interfere with said outer surface (6a) of said stem of force (6), said insulating means being suitable to prevent the entry of impurities within said outer sheath (5) and their contact with said sliding rings (19, 20).

10. Fork (1) as defined in claim 9 characterized in that said insulating means (26) include:
an intermediate clip (27) placed externally coaxial and close to said oil seal disc (25);

a dust cover ring (28) placed externally coaxial and close to said intermediate clip (27), provided with a first portion (29) contained in said outer sheath (5) and a second portion (30) protruding from said outer sheath (5) and interfering with said outer surface (6a) of said stem of force (6), said portions (29, 30) being separated one from each other by an annular projection (31) arranged close to a lower edge (5f) which surrounds said inlet (5a) of said outer sheath (5).

11. Fork (1) as defined in claim 4 characterized in that said outer sheath (5) is provided on the inner surface (5g), at said intermediate portion (5d), with an annular shoulder (32) against which the lateral edge (20a) of said second sliding ring (20) is positioned.

12. Fork (1) as defined in claim 1 characterized in that said rolling means (8) comprise a series of spheres (40) associated with each of said sliding rings (19, 20) that contact with said outer surface (6a) of said stem of force (6).

13. Fork (1) as defined in claim 1 characterized in that each of said sliding rings (19, 20) includes:
 a circular bush (33) coupled inside said outer sheath (5) by mechanical interference;
 a tubular cage (34), coupled inside said circular bush (33) and presenting on a side wall (34a) a plurality of annular tracks (35) flanked and separated from each other, within each of which said rolling means (8) are contained firm and free to move following a close path.

14. Fork (1) as defined in claim 13 characterized in that a straight stretch (35a) of each of said annular tracks (35) is through said side wall (34a) of said tubular cage (34), at said straight stretch (35a) said rolling means (8) partially protruding from said side wall (34a) towards the inside of said tubular cage (34) in order to cooperate by contact with said outer surface (6a) of said stem of force (6).

15. Fork (1) as defined in claim 14 characterized in that said circular bush (33) is provided on an inner wall (33a) with a plurality of longitudinal protuberances (38), directly in front of and opposed to said through straight stretch (35a) of said annular tracks (35), said longitudinal protuberances (38) being interspaced one from each other by a plurality of longitudinal grooves (39) directly facing and opposed to a blind straight stretch (35b), opposite to said through straight stretch (35a), of said annular tracks (35), at said blind straight stretch (35b) said rolling means (8) partially protruding from said side wall (34a) towards the outside of said tubular cage (34) in order to cooperate by contact with said inner wall (33a) of said circular bush (33).

16. Fork (1) as defined in claim 1 characterized in that said stem of force (6) is made of metallic material with a high hardness of not less than 58 HRC.

* * * * *